United States Patent [19]

Taylor

[11] Patent Number: 5,273,065

[45] Date of Patent: Dec. 28, 1993

[54] LARGE DIAMETER AND RELATIVELY HIGH PRESSURE RELIEF VALVE

[76] Inventor: Julian S. Taylor, 8300 SW. 8th, Oklahoma City, Okla. 73128

[21] Appl. No.: 35,766

[22] Filed: Mar. 23, 1993

[51] Int. Cl.⁵ ............................................. F16K 17/14
[52] U.S. Cl. ...................................... 137/70; 137/494
[58] Field of Search ................. 251/282; 137/68.1, 70, 137/71, 494, 509

[56] References Cited

U.S. PATENT DOCUMENTS

| | | | |
|---|---|---|---|
| 4,724,657 | 2/1988 | Taylor | 137/70 X |
| 4,936,714 | 6/1990 | Demicray | 137/494 X |
| 5,012,834 | 5/1991 | Taylor | 137/70 |

Primary Examiner—John C. Fox
Attorney, Agent, or Firm—Robert K. Rhea

[57] ABSTRACT

A pressure relief valve for monitoring pressure in relatively large diameter conductors containing relatively high fluid pressure. The valve having housing openings of equal diameter with respect to the conductor and a flow passageway is provided with different diameter coaxial sleeves slidably receiving dual diameter interconnected pistons. The smaller diameter piston forms a flow passageway stop while the larger diameter piston generates a pressure differential with respect to the smaller diameter piston for moving both pistons toward a flow passageway open position in which a piston rod guides the pistons in their axial movement with respect to the sleeves and collapses a pressure collapsible pin supported by a pin cage connected with the valve body in axial alignment with the piston rod for opening the valve passageway and releasing fluid pressure from the conductor.

10 Claims, 2 Drawing Sheets

LARGE DIAMETER AND RELATIVELY HIGH PRESSURE RELIEF VALVE

BACKGROUND OF THE INVENTION

1. Field of the invention

This invention relates to relief valves and more particularly to a collapsible pin relief valve for fluid systems of relatively large diameter.

In the past, I have successfully utilized a collapsible pin relief valve by utilizing Euler's law acting on a pin for monitoring pressure in a conductor generating a force up to approximately 8,000 pounds (3,600 kg) against the pin.

A collapsible pin in a two inch piston diameter pressure relief valve, connected with a conductor of the same size, containing 5,000 psi (2,250 kg) generates a force on the collapsible pin on the order of 15,000 pounds (6,750 kg). It is desirable to reduce this pin force without reducing the piston diameter.

There is a need for a valve to monitor such pressure in a large diameter, for example, a 24 inch (61 cm) conductor with a 24" piston opening, but this requires an unrealistically large diameter collapsible pin.

This invention solves this problem by providing a collapsible pin relief valve in which dual pistons of different diameter which partially balances out the force acting on the collapsible pin.

2. Description of the prior art

The most pertinent prior patent is believed to be my U.S. Pat. No. 5,012,834, issued May 7, 1991, for Fluid Pressure Flare Relief Valve.

This patent discloses a valve body connected with a fluid line in which the valve body is enlarged and provided with a lateral opening normally closed by a double wall valve head to form a valve head chamber laterally of a fluid passageway through the valve body.

The fluid passageway contains a box-like chamber having aligned bores in opposite walls normally closed by dual pistons secured to a piston rod projecting through the valve head chamber and through the closed end of a cylinder projecting into the valve head chamber and slidably supporting a smaller diameter pilot piston secured to the piston rod.

The outwardly projecting end of the piston rod supports one end of an excess fluid pressure collapsible pin supported at its other end by the end plate of a pin cage surrounding the collapsible pin and connected with the cylinder projecting out of the valve head chamber.

A spring urged poppet valve a admits upstream fluid pressure to the valve head chamber, so that excess pressure above a predetermined value against the pilot piston and the piston remote from the valve head chamber unbalances the pistons, collapsing the pin to release the excess pressure through the passageway downstream outlet.

This invention is distinctive over this patent by proving a valve housing with a flow passageway therethrough in which a guide piston is slidably mounted in the valve housing for movement toward and away from the passageway outlet port and is connected with one end of a hollow cylinder having a smaller diameter stop piston secured to its other end portion and closing the passageway outlet port of the valve body. A piston rod connected with the guide piston opposite the stop piston projects outwardly of the valve body and abuts one end of a collapsible pin supported at its other end by a pin cage means secured to the valve housing.

Fluid pressure in the valve housing acts on confronting surfaces of both pistons. Because of the area difference a major portion of the high pressure is balanced out. A pin holds the stop piston on seat while the force on the pin is proportional to upstream pressure. Excess pressure in the valve housing, beyond the pressure balanced rating of the collapsible pin forces both pistons toward the collapsible pin to collapse the latter and open the fluid passageway.

SUMMARY OF THE INVENTION

A valve body having axially aligned openings and having a lateral opening intermediate the ends of its in-line openings is provided with a fluid outlet open end sleeve projecting inwardly from one of its in-line end openings.

A tubular neck portion diametrically equal with the open end sleeve and having a bolt flange at one end is integrally connected axially at its other end with the valve body.

A second tubular sleeve similarly diametrically equal with the lateral opening and having a bolt flange at one end is integrally connected at its other end with the valve body lateral opening.

The other in-line end opening having an inside diameter greater than the inside diameter of the first named sleeve receives the periphery of a second sleeve having one end closed by a centrally bored disc-shaped member diametrically greater than the sleeve to form a sleeve bolt flange for connection with the valve body opposite the fluid outlet sleeve.

Dual disk-shaped pistons comprising a guide piston and a stop piston axially connected by a hollow cylinder are axially disposed between the valve body in-line openings with the guide piston slidably received for longitudinal sliding movement within the closed end sleeve and the stop piston normally closing the inward open end of the fluid outlet sleeve.

The guide piston is centrally provided with a piston rod projecting through the central bore of the closed end second sleeve.

A cage member formed by a plurality of standards projecting longitudinally outward of the second sleeve closed end and interconnected at their opposite ends by a cap supports a collapsible pin axially extending between the piston rod and the cage cap.

The guide piston forms a chamber in the closed end sleeve which communicates with the atmosphere through a check valve and a manually opened set screw.

In another embodiment, the bolt flange equipped inlet and outlet neck members are elongated and cooperatively curved and disposed in axial alignment.

The principal object of the present invention is to provide a fluid pressure relief valve for high pressure fluid in relatively large diameter conductors or containers by balancing out the major portion of the high pressure fluid in order to utilize a portion of the high pressure fluid above a predetermined value for biasing a pressure relief valve to an open position.

DESCRIPTION OF THE PREFERRED EMBODIMENTS

Figure 1:
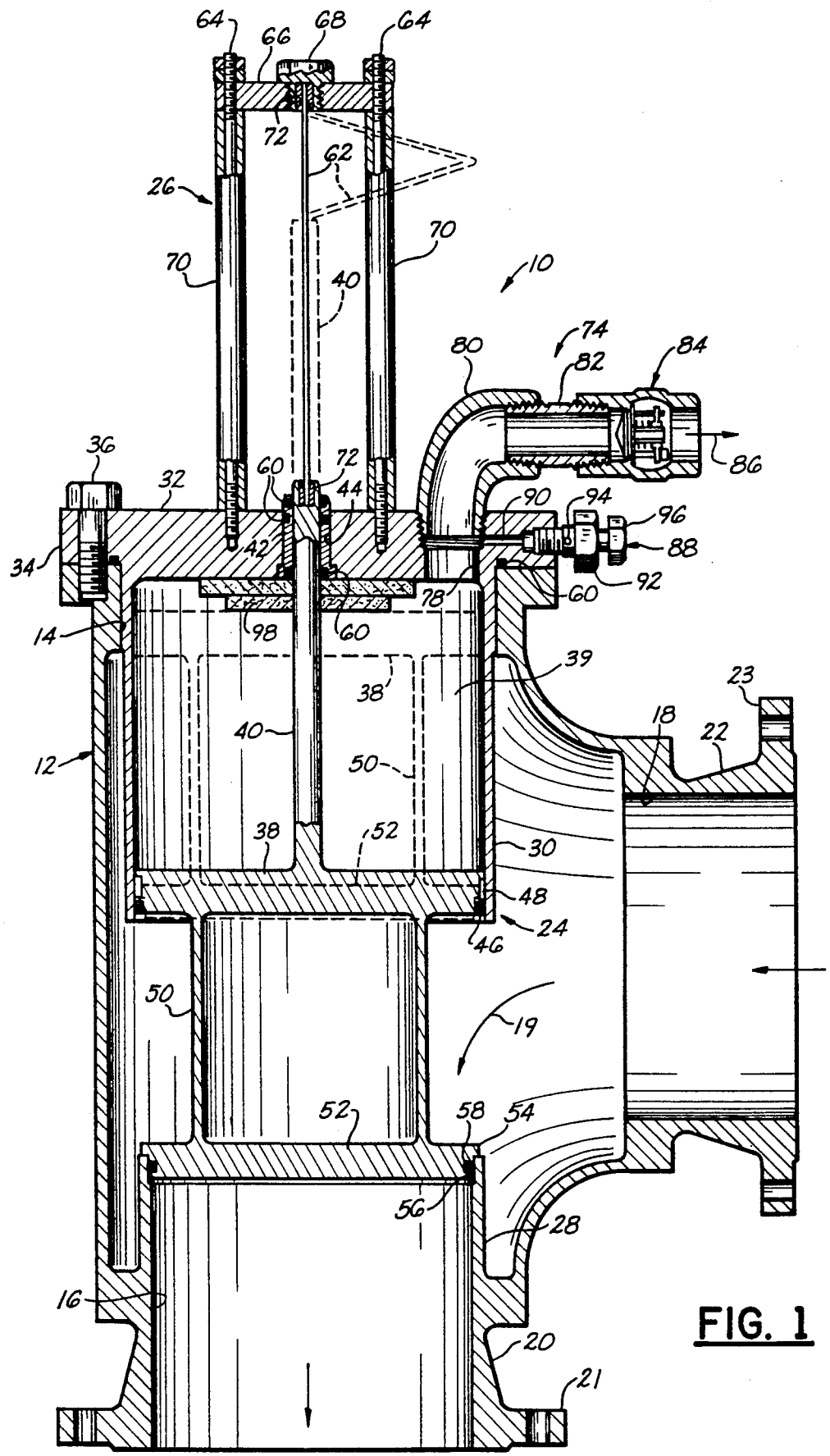
FIG. 1 is a vertical cross sectional view of one embodiment of the valve partially in elevation; and, FIG. 2 is a similar view o another embodiment having axially aligned inlet and outlet openings.

Like characters of reference designate like parts in those figures of the drawings in which they occur.

In the drawings:

Referring primarily to FIG. 1, the reference numeral 10 indicates the valve as a whole which is generally pipe Tee-shaped in overall configuration.

The valve 10 comprises a body 12 having coaxially aligned openings 14 and 16 normal to an inlet opening 18. The diameter of the opening 14 is greater than the diameter of the opening 16 for the reason believed presently apparent.

A tubular neck member 20 having a inside diameter equal with respect to the diameter of the opening 16 and having a bolt flange 21 at one end is integrally connected at its other end with the body 12 coaxial with the opening 16.

Similarly, a second tubular neck member 22 having a bolt flange 23 at one end is coaxially connected with the body inlet opening 18 for forming a fluid passageway 19 through the valve housing 12 when the valve 10 is biased to an open position, as hereinafter explained.

Sleeve and piston means 24 normally close the fluid passageway until released by pin and cage means 26, as hereinafter explained. A first sleeve 28 is coaxially connected with the valve opening 16 opposite the neck member 20. A second sleeve 30 is coaxially received by the body opening 14. The outwardly disposed end of the second sleeve 30 is closed by a centrally bored disc-shaped cap 32 of larger diameter than the second sleeve 30 or forming a bolt flange 34 secured to the valve body 12 by bolts 36 for closing the sleeve 30 and opening 14.

The sleeve and piston means 24 further includes disc-shaped pressure releasing piston head 38 slidably received by the second sleeve 30 and defines a sleeve chamber 39 containing atmospheric pressure. The piston head 38 being centrally provided with a piston rod 40 longitudinally slidable in a bushing 42 coaxially disposed in the piston cap central bore 44 for guiding the piston rod during piston head 38 movement toward and away from the piston cap, as hereinafter explained.

The periphery of the piston head is provided with an O-ring seal 46 for sealing with the inner surface of the second sleeve wall and a circumscribing band 48, preferably formed from friction reducing plastic material, such as that presently marketed under the Trademark NYLON having self lubricating properties when moved in frictional contact with metallic surfaces.

The piston head surface opposite the stem 40 is axially connected with a tubular member 50 in turn axially connected with a disc-shaped piston stop or valve 52 having a rabbeted edge forming a stop shoulder 54 which abuts the innermost end surface of the first sleeve 28. A second O-ring 58 seals with an annular valve seat 56 formed on the inner wall surface of the inward end portion of the first sleeve 28, thus, preventing fluid flow in the direction o the arrow 19.

Other O-ring seals 60 seal the sleeve cap 32 with the valve body, the bushing 42 with the sleeve cap 32 and the piston rod 40 with the bushing 42 in a conventional manner.

The pin cage means 26 is axially connected with the sleeve cap 32 and extends beyond the outward end of the piston rod 40 for axially supporting an axially collapsible pressure relief pin 62 in combination with the adjacent end of the piston rod.

The pin cage means comprises a plurality (3 or 4), three being shown, rod like bolts 64 connected at one end in 90° spaced relationship with the sleeve cap 32 and having an end plate 66 at their outward ends axially supporting a threadedly connected pin holder 68. Each of the bolts 64 is surrounded by a sleeve spacer 70 for maintaining the pin end plate 66 a predetermined distance from the outwardly projecting end of the piston rod 40. The outwardly projecting end of the piston rod and the downwardly projecting portion of the pin holder 68 are each centrally bored for receiving pin bushings 72, for nesting respective end portions of the collapsible pin 62.

Vent means 74 exhaust air from the sleeve chamber 39 when the piston means moves toward the sleeve cap as hereinafter explained. The vent means 74 includes a lateral sleeve cap bore 78 which is threadedly connected with a tubular member, such as a pipe street-Tee 80 threadedly receiving a pipe nipple 82 threadedly connected with a poppet check valve 84 for exhausting air from the chamber 39 in the direction of the arrow 86 as the piston head is moved toward the sleeve cap 32.

The check valve 84 is preferably a poppet check valve, as fully disclosed and claimed in my U.S. Pat. No. 4,437,492. Briefly stated, the poppet valve 84 comprises an open end valve body having an annular seat adjacent its pipe nipple connected end for receiving and sealing with a valve member spring urged toward and away from the seat and guided in its axial movement in the valve body by webs projecting toward the end of the valve housing opposite its seat.

Ambient air inlet means 88 is also provided for admitting air to the chamber 39 when the piston head is manually moved toward the first sleeve 28 in resetting the valve after a pin collapse action, as presently explained. The inlet air means 88 comprises a radially inward directed bore 90 intersecting the exhaust outlet bore 78 and at its outward end threadedly receives an axially bored stud bolt 92 having a lateral bore 94 adjacent its wrench head and an annular seat, not shown, inwardly of the lateral bore for seating the inward end of a second stud bolt 96 threadedly received by the stud bolt 92 for sealing or opening the chamber 39 to the atmosphere, as presently explained.

Figure 2:
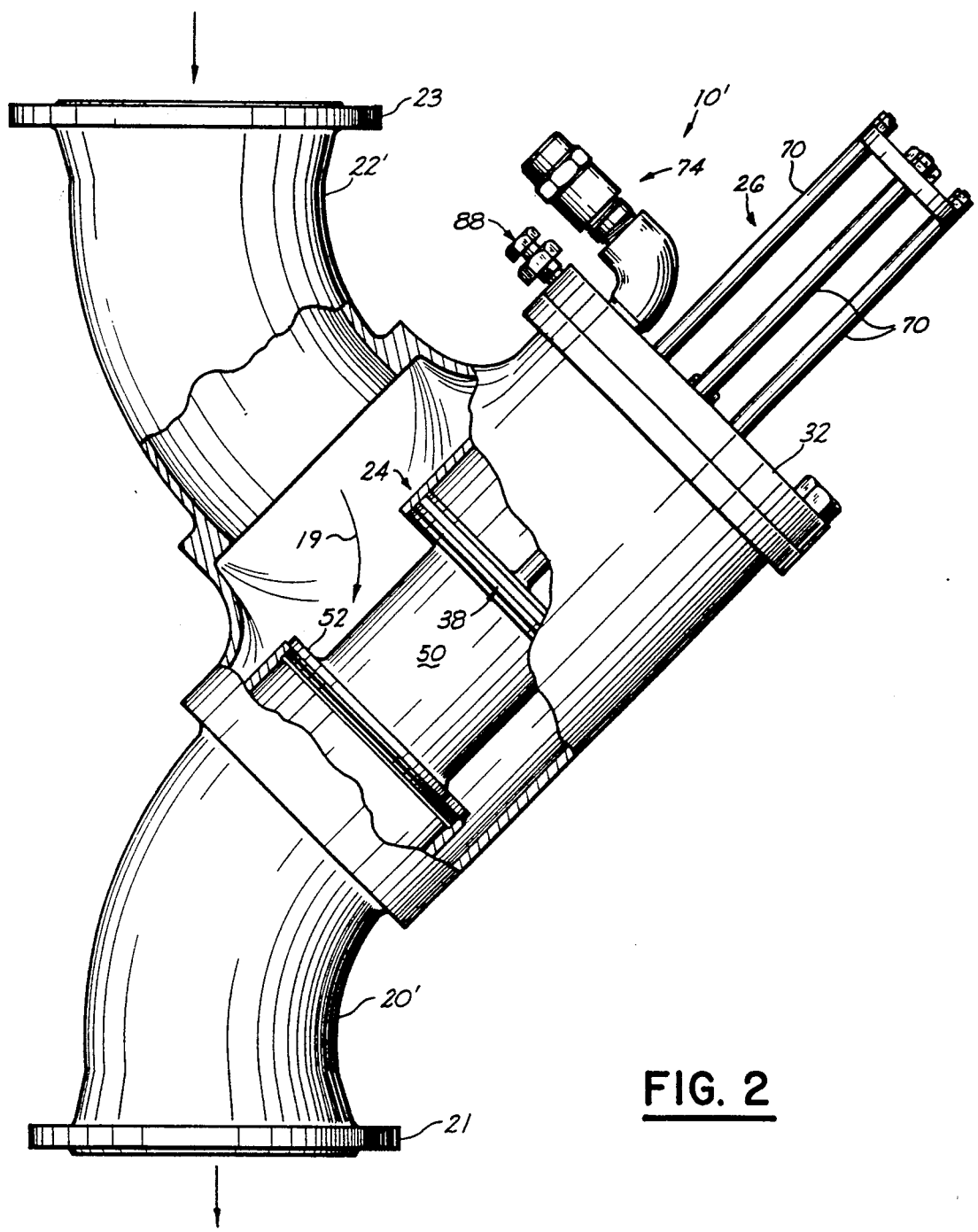

Referring also to FIG. 2, a second embodiment of the valve is indicated at 10' in which identical parts have identical reference numerals.

It is sometimes impractical to utilize a right angular valve, as illustrated by FIG. 1, and field conditions necessitate that the valve be installed in-line. To accomplish this the inlet and outlet necks of the embodiment 10 as indicated at 20' and 22' are respectively elongated and curved in a cooperative direction, so that the respective bolt flanges 21 and 23 on the neck members are parallel and in coaxial alignment with respect to each other to be interposed in a pipe line, not shown.

OPERATION

The selected valve 10 or 10' is connected with a pipe or fluid conductor to protect equipment or the conductor from excessive fluid pressure.

Initially, the valve is in a fluid passageway closed position, as illustrated by the solid lines in the drawings, wherein the passageway 19 is closed by the smaller stop piston 52 seated on the inwardly projecting the end of the sleeve 28.

As explained hereinabove, the piston head 38 is diametrically greater than the diameter of the piston head 52 so that a larger area of the piston head 38 is exposed to the fluid pressure within the valve body than is exposed to the fluid pressure by the stop piston 52, thus, generating a differential in pressure acting on the pistons and the collapsible pin 62. The difference in diameters of the pistons 38 and 52, thus, partially balances out the greater portion of the fluid pressure within the valve body, so that this fluid pressure can be controlled by the collapsible in 62 and its pin cage means.

When the pressure differential on the pistons 38 and 52 exceeds a predetermined value this pressure moves the pistons and piston rod 40 toward the pin cage means 26 which collapses or buckles the pin 62 toward its dotted line position. The piston head 38 impact on the sleeve cap 32 and is cushioned by packing or resilient members 98 secured to the inner surface of the sleeve cap 32 around the piston rod.

As the piston 38 moves upwardly, as viewed in FIG. 1, air in the chamber 39 is exhausted through the one way valve 84. After pressure in the valve has been released, and fluid pressure in the conductor shutoff, the valve may be reset by manually opening the inlet stud 96 to admit air through the radial bore 90 to the chamber 39.

As the piston rod is manually forced downwardly to seat the piston head 52 on the sleeve 28 the collapsed pin 62 is removed and the pin holder 68 is temporarily loosened in the plate 66 sufficiently to install a new replacement pin, not shown, and place the valve in fluid pressure monitoring position.

Obviously the invention is susceptible to changes or alterations without defeating its practicability. Therefore, I do not wish to be confined to the preferred embodiment shown in the drawings and described herein.

I claim:

1. A relief valve for connection with a large diameter conductor containing a relatively high fluid pressure, comprising:
    a valve body having axially spaced longitudinally aligned openings,
    one said aligned opening forming an outlet port of smaller diameter than the other said aligned opening,
    said body having a lateral opening forming the inlet port of a fluid passageway through the body;
    sleeve means projecting axially inward from each said aligned opening including a guide sleeve having a centrally bored end wall for closing the said other aligned opening;
    dual piston means including spaced-apart pistons supported by the sleeve means for normally closing the fluid passageway;
    a piston rod projecting outwardly through the sleeve end wall opposite the outlet port; and,
    collapsible pin means including a pin having a predetermined buckling point axially supported by the outwardly projecting end of the piston rod for maintaining said dual piston means in fluid passageway closed position while the fluid pressure differential on said pistons is less than the buckling point of the pin.

2. The relief valve according to claim 1 in which the collapsible pin means includes:
    pin cage means axially projecting outward from the guide sleeve end wall; and,
    a collapsible pin axially supported between the outward end portions of said pin cage means and said piston rod.

3. The relief valve according to claim 2 in which the dual piston means further includes:
    a guide piston and a smaller diameter stop piston, said guide piston normally disposed adjacent the inward limit of the guide sleeve forming a guide sleeve chamber and axially slidable toward the guide sleeve end wall,
    said stop piston overlying the inward end of the other said inwardly projecting sleeve in fluid passageway closed position; and, valve means for exhausting and admitting atmospheric air from and to the sleeve chamber when the guide piston is moved toward and away from the sleeve end wall.

4. The relief valve according to claim 3 in which the axes of the inlet and outlet ports are disposed in right angular relation.

5. The relief valve according to claim 3 in which the axes of the inlet and outlet ports are disposed in aligned relation.

6. A relief valve for connection with a large diameter conductor containing fluid under greater than atmospheric pressure, comprising:
    a valve body having axially spaced longitudinally aligned openings,
    one said aligned opening forming an outlet port of smaller diameter than the other said aligned opening,
    said body having a lateral opening forming the inlet port of a fluid passageway through the body;
    sleeve means projecting axially inward from each said aligned opening including an outlet port sleeve of equal diameter with respect to the outlet port and a guide sleeve having a centrally bored end wall forming an annular outstanding flange for closing the said other aligned opening;
    dual piston means including:
        a guide piston slidable in said guide sleeve and closing its end opposite its end wall; and,
        a stop piston axially connected with said guide piston and having an outer diameter closely received by said outlet port sleeve for normally closing the latter;
    a piston rod projecting outwardly through the sleeve end wall opposite the outlet port; and,
    collapsible pin means including a pin having a predetermined buckling point axially supported by the outwardly projecting end of the piston rod for maintaining said dual piston means in fluid passageway closed position while the fluid pressure acting on the differential piston area results in a force less than the buckling point of the pin.

7. The relief valve according to claim 6 in which the collapsible pin means includes:
    pin cage means including elongated members axially projecting outward from the guide sleeve end wall; and,
    a plate interconnecting the end portions of said members opposite the guide sleeve end wall and supporting the end portion of said pin opposite the piston rod.

8. The relief valve according to claim 7 and further including:
    valve means for exhausting and admitting atmospheric air from and to the sleeve chamber when the guide piston is moved toward and away from the sleeve and wall.

9. The relief valve according to claim 8 in which the axes of the inlet and outlet ports are disposed in right angular relation.

10. The relief valve according to claim 9 in which the axes of the inlet and outlet ports are disposed in aligned relation.

* * * * *